United States Patent [19]

Standley

[11] 4,311,474
[45] Jan. 19, 1982

[54] SYNCHRONOUS BELT AND METHOD FOR MAKING THE SAME

[75] Inventor: Paul M. Standley, Springfield, Mo.

[73] Assignee: Dayco Corporation, Dayton, Ohio

[21] Appl. No.: 75,400

[22] Filed: Sep. 14, 1979

[51] Int. Cl.³ .......................... F16G 1/28; B29H 7/22
[52] U.S. Cl. .................................. 474/205; 156/137; 198/847
[58] Field of Search ............... 74/231 R, 231 C, 232, 74/233, 234; 198/335, 337, 847; 156/137, 138; 474/122, 238, 261, 262, 266, 268, 271, 205

[56] References Cited

U.S. PATENT DOCUMENTS

| 2,507,852 | 5/1950 | Case | 74/237 |
|---|---|---|---|
| 2,983,637 | 5/1961 | Schmidt | 74/231 C |
| 3,212,627 | 10/1965 | Beebee | 198/847 |
| 3,756,091 | 9/1973 | Miller | 74/231 C |
| 3,897,291 | 7/1975 | Hoback et al. | 156/138 |
| 3,911,755 | 10/1975 | Vance, Sr. | 74/231 R |
| 3,924,481 | 12/1975 | Gregg | 74/231 C |
| 4,106,966 | 8/1978 | Brooks | 156/138 |

FOREIGN PATENT DOCUMENTS 4692 3/1916 United Kingdom ................. 74/234

Primary Examiner—C. J. Husar
Assistant Examiner—Conrad Berman
Attorney, Agent, or Firm—Charles E. Bricker

[57] ABSTRACT

A synchronous belt is provided which has a plurality of angled ridges in the backing layer thereof. These ridges are oriented in a direction opposite the direction of the spirally wound tensile cord and the magnitude of the ridge angle is at least equal to the magnitude of the cord spiral angle. Also provided is a process for making this belt.

5 Claims, 4 Drawing Figures

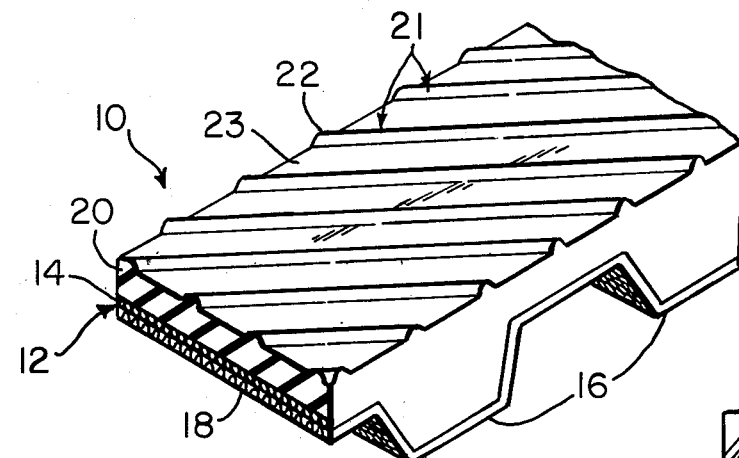
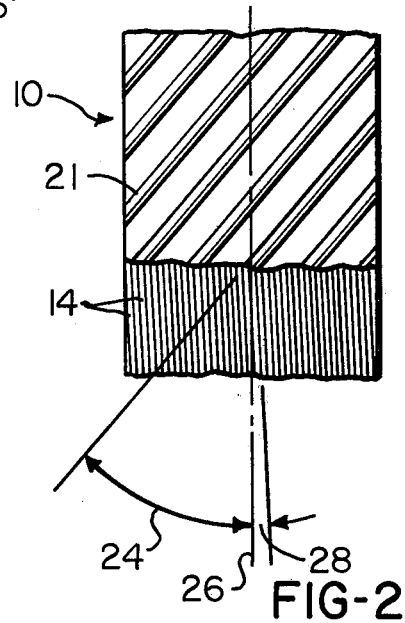
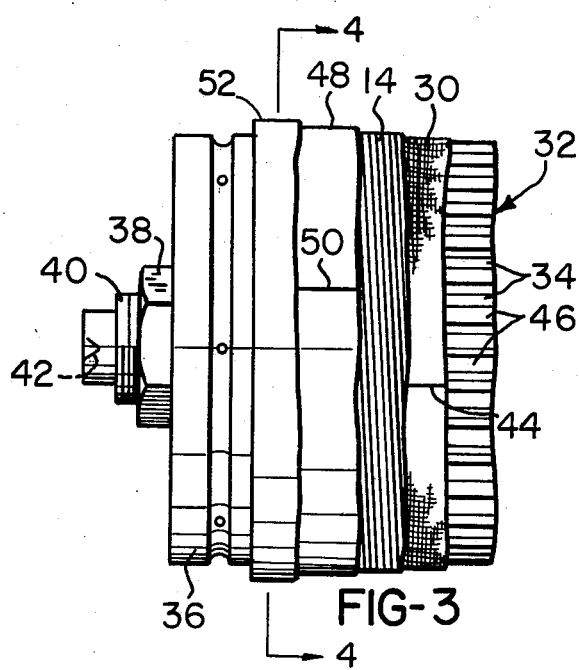
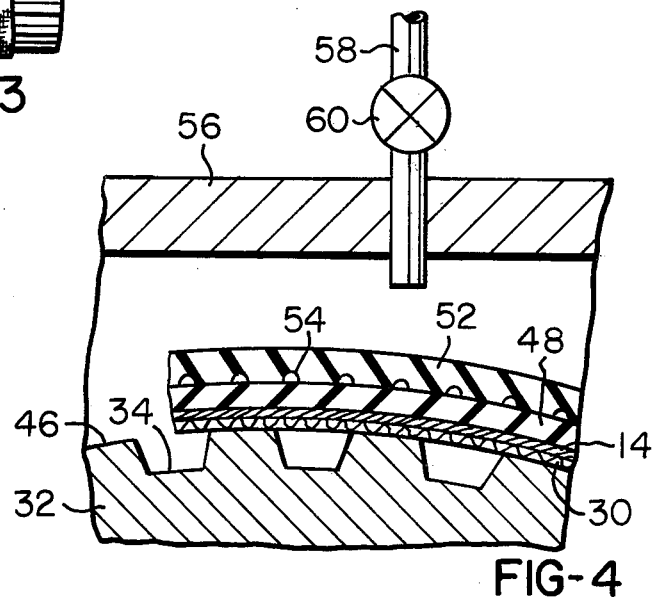

SYNCHRONOUS BELT AND METHOD FOR MAKING THE SAME

BACKGROUND OF THE INVENTION

This invention relates to a synchronous belt and to a method for making the same.

A conventional synchronous belt, as described in Case, U.S. Pat. No. 2,507,852, has teeth of essentially trapezoidal cross-section which are similar to gear rack teeth. More recently, various changes in the contour or configuration of the belt tooth have been made. For example, Miller, U.S. Pat. No. 3,756,091 discloses a belt which includes driving teeth of a special curvilinear cross-sectional configuration. Another example is Gregg, U.S. Pat. No. 3,924,481 which discloses a belt having driving teeth of a special curvilinear cross-sectional configuration.

A problem which is common to virtually all synchronous belts is that of "tracking", i.e. the tendency of the belt to shift sideways during its rotation. It has been determined that a belt will tend to track in the direction of the lead of a spiralled tensile cord embedded therein. The tendency to track is also dependent upon cord twist.

One prior art solution to the tracking problem is found in Schmidt, U.S. Pat. No. 2,983,637, which discloses a synchronous belt having two layers of spiralled tension cords. The cords in the two layers are spiralled in opposite directions to form helices having an opposite inclination so that the longitudinal pull or tension is balanced and the tendency of the belt to creep sideways is diminished.

Since synchronous belts may be thought of as felt belts with transverse driving teeth, another prior art solution is found in Vance, U.S. Pat. No. 3,911,755 which discloses a single layer having oppositely twisted cords spiralled side-by-side at substantially the same angle in relation to the longitudinal axis of the belt. By placing the two cords side-by-side in the tensile section, each has an opposite influence on the tracking. There remains, however, the tracking effect of the spiral of the cords.

The most common solution to the tracking problem is merely to employ toothed pulleys having radial flanges which limit the sideways travel of the belt. Unfortunately, this simple solution may also introduce another problem, that being the problem of wear on the side face of the belt.

Accordingly, it is an object of the present invention to provide a synchronous belt having a reduced tracking tendency.

Another object of this invention is to provide a method for making a synchronous belt having a reduced tracking tendency.

Other objects, aspects and advantages of the present invention will be apparent to those skilled in the art from the following description of the invention.

SUMMARY OF THE INVENTION

In accordance with the present invention there is provided a synchronous belt comprising a tensile member of spirally wound cord, a plurality of substantially evenly spaced teeth secured to one side of the tensile member and an elastomeric backing layer comprising a plurality of ridges secured to the opposite side of the tensile member, wherein the ridges are oriented to offset the tracking effect introduced by the spiralled cords.

Also provided is a method for making a synchronous belt having reduced tracking tendency which comprises the steps of winding a tensile cord spirally around a building drum having a plurality of transverse projections and recesses, winding a layer of elastomeric material over the cord, placing a curing jacket having a plurality of projections and recesses on the inside thereof around the rubber, and vulcanizing, or otherwise curing, the elastomeric material. During the curing step the elastomeric material softens and flows through the spirally wound cord and into the recesses in the building drum to define the belt teeth.

BRIEF DESCRIPTION OF THE DRAWING

In the drawing,

FIG. 1 is a perspective view of the synchronous belt of this invention;

FIG. 2 is a top view illustrating the relationship of the top ridges and the tension cords;

FIG. 3 is an elevational view of a belt mold with the belt parts built up thereon in readiness for the molding operation, but showing parts of the belt broken away to better illustrate the method; and FIG. 4 is an enlarged, partial cross-sectional view of the mold assembly taken along lines 4—4 of FIG. 3.

DETAILED DESCRIPTION OF THE DRAWING

The synchronous belt 10, shown in FIGS. 1 and 2, comprises a tensile member 12, which in the embodiment shown, is a spirally wound cord 14. The cord 14 is a conventional cord, made of a suitable material, such as polyester, aramid, nylon, or the like. A plurality of substantially evenly spaced teeth 16 are secured to one side of the tensile member 12. A fabric member 18 covers the outside surfaces of the teeth 16. On the opposite side of the tensile member 12, an elastomeric backing layer 20 is secured thereto. The backing layer 20 has a plurality of longitudinally spaced ridges 21 molded therein and defined by alternating projections 22 and recesses 23. These ridges 21 are disposed at an angle 24 to longitudinal axis 26 of the belt 10 and are disposed in the direction opposite the direction of disposition of the spiralled cord 14. The angle 24 is at least equal to the spiral angle 28 of the cord relative to the longitudinal axis 26. Generally the angle 24 can range in magnitude between the magnitude of the angle 28 and 45 degrees. The size, i.e., height, and spacing of the ridges 21 must be determined in practice due to differences in the belt construction materials; however, in general, the height of the ridges 21 can range between about one half and 4 times the major diameter of the cord 14. The spacing 23 between the ridges 21 can range from side-by-side spacing up to about 10 times the major diameter of the cord 14.

The method of making the belt 10 is illustrated in FIGS. 3 and 4 of the drawing. The tooth cover 18 is made from a stretchable fabric 30, which is wrapped circumferentially around a cylindrical mold 32 having a plurality of axially extending grooves 34 in its outer circumference which constitute belt tooth cavities for forming the belt teeth 16. The body of the mold has end plates 36, which are clamped to the ends of the mold 32 by nuts 38 threaded onto each of the ends of a spindle 40 having centering bores 42.

The fabric 30 is preferably stretchable in one direction only and the stretch therein extends circumferentially of the mold 32. Before being applied, the fabric 30 is at least partially covered with an elastomeric material, such as by calendering an elastomeric material onto at least one side of the fabric. The ends of the fabric 30 are united with a lap joint 44 placed over the ridges 46 between the grooves 34.

The tensile member 12 for several belts is formed on the mold 32 by automatically winding over the fabric sleeve 30 a plurality of turns, or convolutions of the cord 14. A layer 48 of elastomeric material is placed atop the cord 14 and butt jointed, as at 50. The layer 48 is in the form of a calendered sheet and is of sufficient thickness to provide the extruded elastomeric body portion of the teeth 16, to surround the cord 14 and to provide the backing layer 20 and the ridges 21.

Having assembled the belt materials on the mold 32, the assembly is prepared to be placed in a suitable vulcanizer, generally a steam vulcanizer in which a portion of the elastomeric layer 48 is forced through the windings of the cord 14 into the mold grooves 34. A collapsible sleeve 52, made of a reuseable elastomer, is placed over the layer 48. The sleeve 52 has a plurality of grooves 54 which, during the vulcanizing step, form the ridges 21.

The mold 32, having the belt materials and the sleeve 52 assembled thereon, is placed in a curing chamber 56 or a similar sealed vulcanizing kettle or autoclave to which is supplied steam or other suitable curing medium through conduit 58, controlled by valve 60. The steam, at an elevated pressure, is sufficiently hot to soften the elastomeric layer 48, and the pressure is sufficiently high to collapse the sleeve 52 and force the relatively fluid elastomer through the voids in the spiral group of convolutions of the cord 14 and into the axially extending grooves 34 to form the belt teeth 16. The elastomer forces the stretchable fabric jacket 30 ahead of it and causes the fabric to conform to the shape of the tooth forming grooves 34. The elastomer 48 softens below its curing temperature, and there is sufficient volume of elastomer in the layer 48 to completely fill the grooves 34, as well as to form the backing layer 20 and the ridges 21. After the grooves 34 are completely filled, additional heat is supplied to the vulcanizer to cure the elastomeric portions of the belt.

After the belt is cured, the mold 32 is removed from the vulcanizer 56, the sleeve 52 is removed from the mold, and the molded belt band is stripped from the mold. Individual belts of desired width, may be sliced from the molded belt band by cutting the band circumferentially.

Although the drawing illustrates a synchronous belt having trapezoidal shaped teeth, the present invention is not limited thereto. It may also be used to make synchronous belts having the tooth shapes shown, for example, in U.S. Pat. Nos. 3,756,091 and 3,924,481.

The terms "elastomer" and "elastomeric material", as used herein, are intended to include any elastomeric material known in the art, such as natural and synthetic rubber, synthetic plastic materials, and the like, including blends thereof.

While the preferred form of this invention has been described and illustrated herein, it is to be understood that various modifications may be made without departing from the spirit of the invention and the scope of the appended claims.

I claim:

1. An endless power transmission belt comprising:
   (a) an endless tensile member of spirally wound cord
   (b) a plurality of substantially evenly spaced transverse elastomeric teeth secured to one side of said tensile member
   (c) an elastomeric backing layer comprising a plurality of longitudinally spaced ridges defined by alternating projections and recesses secured to an opposite side of said tensile member, wherein said ridges are oriented at an angle which is opposite in direction and at least equal in magnitude to the spiral angle of said cord, with respect to a longitudinal axis of said belt.

2. The belt of claim 1 further comprising a fabric layer, secured to said teeth and to the root between said teeth, and defining the outline of said teeth.

3. The belt of claim 1 wherein said ridge angle is in the approximate range of from said spiral angle to 45 degrees.

4. In a process for making an endless synchronous power transmission belt comprising the steps of wrapping a fabric around a cylindrical mold having a plurality of axially extending tooth-forming grooves in its outer circumferential surface, spirally winding a plurality of turns of tensile cord over said fabric, placing a layer of elastomeric material over the resulting cord windings, placing a collapsible sleeve around said elastomeric material and vulcanizing the resulting belt assembly whereby at least a portion of said elastomeric material flows through said cord winding to form the teeth of said belt, at least a portion of said elastomeric material surrounds and embeds said cord and the remainder of said elastomeric material provides a backing layer for said belt, the improvement which comprises placing a collapsible sleeve having a plurality of grooves in the inner circumferential surface thereof around said elastomeric material layer, wherein said grooves are disposed in said sleeve at an angle which is opposite to and at least equal in magnitude to the spiral angle of said cord, with respect to a longitudinal axis of said belt and thereafter vulcanizing said belt assembly, whereby at least a portion of said remainder of said elastomeric material providing said backing layer, flows into said grooves in said sleeve to provide ridges in the backing layer of the finished belt.

5. The process of claim 4 wherein the angle of said grooves in said sleeve is in the approximate range between said spiral angle and 45 degrees.

* * * * *